Nov. 9, 1926.
J. G. FOGARTY
1,606,622
ANTISKID DEVICE OR EXTRICATOR
Filed April 2, 1926
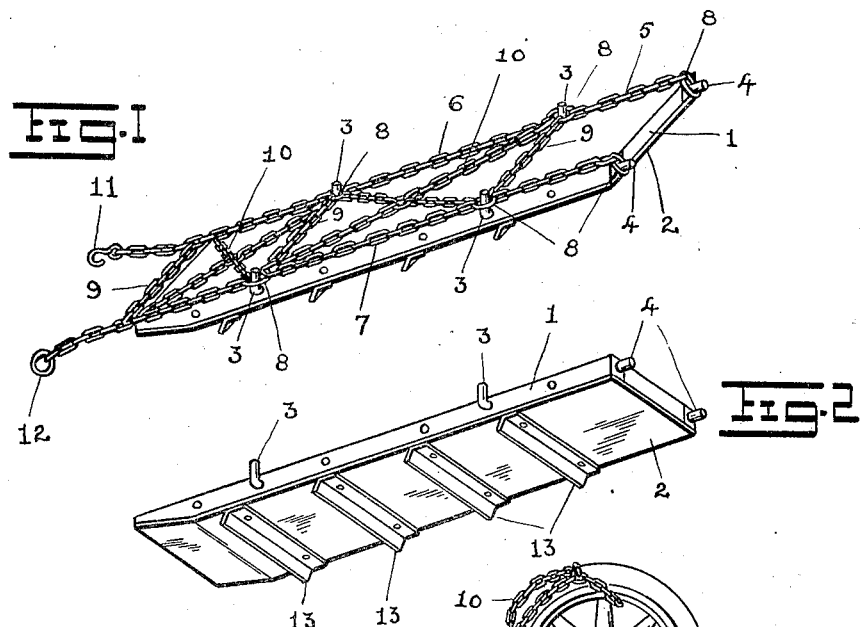
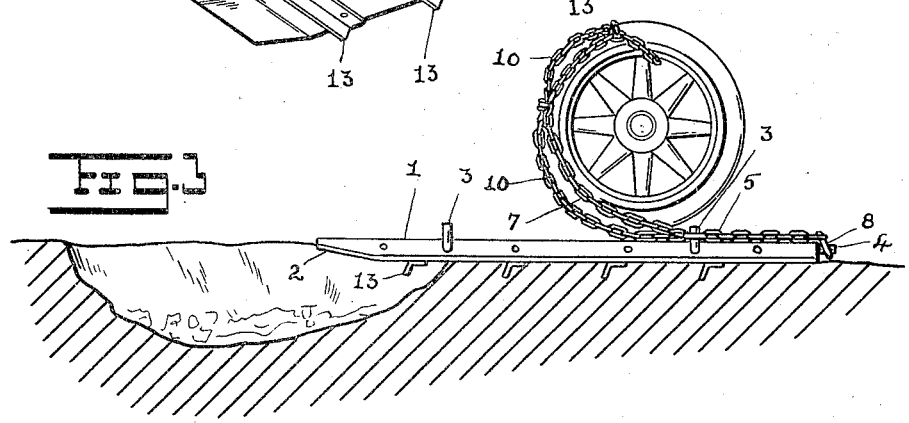
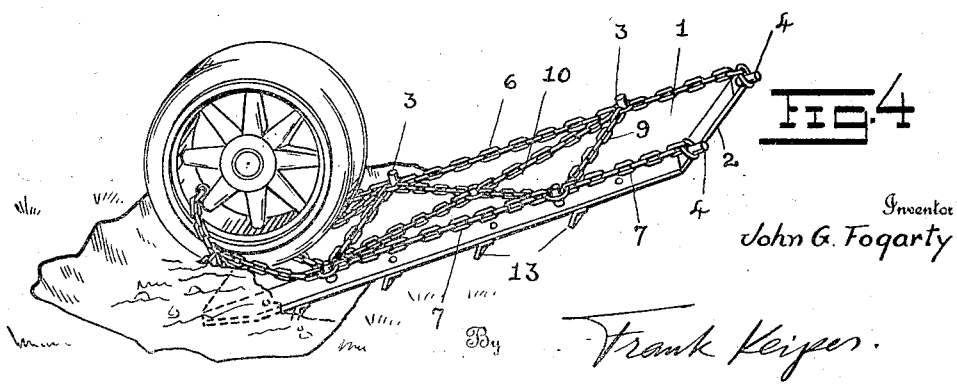
Inventor
John G. Fogarty
By Frank Keiper.
Attorney Patented Nov. 9, 1926.

1,606,622

UNITED STATES PATENT OFFICE.

JOHN G. FOGARTY, OF WEST WEBSTER, NEW YORK, ASSIGNOR OF ONE-HALF TO SWEENEY AND BOLAND, A COPARTNERSHIP CONSISTING OF MICHAEL E. SWEENEY, OF BRIGHTON, AND PATRICK T. BOLAND, OF ROCHESTER, NEW YORK.

ANTISKID DEVICE OR EXTRICATOR.

Application filed April 2, 1926. Serial No. 99,219.

The object of this invention is to provide an improved type of an anti-skid device which is especially adaptable for extricating a heavy vehicle such as an automobile truck out of a hole or soft ground.

This and other objects of the invention will be fully illustrated in the drawings, described in the specification and pointed out in the claims at the end thereof.

In the accompanying drawing:

Figure 1 is a perspective view of the antiskid device, illustrating the top and one side.

Figure 2 is a perspective view of the antiskid device illustrating the bottom and one side thereof, the chain being omitted therefrom.

Figure 3 is a side elevation of the anti-skid device with a wheel located on top thereof illustrating the position of the anti-skid device after the wheel has been extricated from a hole by means of the device.

Figure 4 is a perspective view of the skid and a wheel positioned thereon, the anti-skid device being placed in position to extricate the wheel out of a hole.

In the several figures of the drawings like reference numerals indicate like parts.

The extricating or anti-skid device forming the subject matter of this invention comprises a flat base 1 built up of heavy timber and provided at the bottom with the metal plate 2. The base is wedge shape at the front so that it can be readily placed under the wheel or wheels to be extricated thereby. On each side of the base are provided a series of pins 3, 3 which are suitably threaded into the sides but project upwardly therefrom. In addition to the pins 3, 3 on the sides of the base two more pins 4, 4 are provided at the end thereof. On the pins 3 and 4 is anchored the anti-skid chain 5. This chain is built up of the side chains 6 and 7 which are provided with the rings 8, 8 at suitable intervals and at one end thereof so as to engage the pins 3 and 4 to hold the chain against sliding on the base 1. The side chains 6 and 7 are connected by the cross chains 9, 9 and the diagonal chains 10, 10 forming a chain net that is firmly held against movement on the base 1 by the pins 3 and 4.

At suitable intervals on the bottom of the base are provided a series of cross members 13, 13. These cross members are formed of angle irons which have an angle somewhat larger than 90 degrees so that the flange formed by these cross members and projecting from the bottom of the base slightly slants toward the front of the extricator as illustrated in the figures.

The pins holding the chain in place on the base are of uniform diameter and located so that the rings of the chains engaging these pins are free to disengage themselves from the base when raised up and pulled away therefrom. As illustrated in Figure 1 the forward end of the side chain 6 is provided with a hook 11 while the end of the chain 7 is provided with the ring 12.

When it is desired to extricate a truck out of a hole or out of soft ground the anti-skid or extricator is placed under the wheel as illustrated in Figure 4, and the end of the side chain 6 connected through the wheel with the end of the side chain 7 by means of the hook 11 and ring 12. The truck is then started so that the wheel attached to the chain starts to creep up on the base 1. As the wheel creeps up it first takes hold on the first cross chain 9, and then starts to pull on the diagonal chains 10. The diagonal chains serve to keep the wheel in the middle of the base as an equal pull will be exerted by them on the pins provided at each side of the base. In this way the wheel gradually pulls itself up on the base of the extricator and keeps it in the middle thereof until it has reached the position indicated in Figure 3 when the chains may be detached from the wheel to let the wheel run off the base.

The diagonal chains perform the duty of keeping the wheel in the middle of the base as they prevent the wheel from sliding off to one side of the base or prevent the wheel as it rotates from crowding the base to one side. Through the diagonal chains the pull of the wheel is equally distributed on both sides of the extricator so that it cannot shift to one side after it is once located thereon.

The cross bars 13, 13 serve to hold the extricator against sliding over the ground when the wheel moves up on it. These bars are forced onto the ground and because they are slightly bent rearwardly as illustrated in the figures of the drawing hold the base firmly against sliding.

The pins 3, 3 are cut angularly, that is, the part of the pin fastened to the base is parallel with the top and bottom thereof, and is threaded into the sides while the portion projecting from the base projects upwardly at right angles thereto, and above the base 1. Any dirt that might adhere to the pins can therefore be readily knocked off keeping these pins clean at all times so that the rings in the chain can readily be slipped over them to hold the chain in place on the base.

I claim:

1. In an anti-skid device or extricator for vehicles, the combination of a base, a series of pins anchored in the sides of said base and projecting upwardly therefrom, a pair of pins in the end of said base and projecting outwardly therefrom, a chain net comprising a pair of side chains, rings on said side chains adapted to engage said pins on the sides and the pins at the end of said base, cross chains and diagonal chains connecting said chains at their points of engagement with said pins in the sides of said base.

2. In an anti-skid device or extricator for vehicles, the combination of a base, a series of pins anchored in the sides of said base and projecting upwardly therefrom, a pair of pins in the end of said base and projecting outwardly therefrom, a chain net comprising a pair of side chains, rings on said side chains adapted to engage said pins on the sides and the pins at the end of said base, cross chains and diagonal chains connecting said chains at their point of engagement with said pins in the sides of said base, a metal base plate on the under side of said base cross members attached to said base plate, forwardly slanting flanges depending from said cross members and means for connecting the front ends of said side chains and attaching them to a wheel.

In testimony whereof I affix my signature.

JOHN G. FOGARTY.